US007114228B2

(12) United States Patent
Lambert

(10) Patent No.: US 7,114,228 B2
(45) Date of Patent: Oct. 3, 2006

(54) MOTOR VEHICLE SUSPENSION SPRING COMPRESSOR

(75) Inventor: Patrick Lambert, Courtenay (FR)

(73) Assignee: Mecanique Energetique, Egreville (FR)

( * ) Notice: Subject to any disclaimer, the term of this patent is extended or adjusted under 35 U.S.C. 154(b) by 0 days.

(21) Appl. No.: 10/500,386

(22) PCT Filed: Dec. 23, 2002

(86) PCT No.: PCT/FR02/04524

§ 371 (c)(1),
(2), (4) Date: Jun. 28, 2004

(87) PCT Pub. No.: WO03/057414

PCT Pub. Date: Jul. 17, 2003

(65) Prior Publication Data

US 2005/0125977 A1 Jun. 16, 2005

(30) Foreign Application Priority Data

Jan. 11, 2002 (FR) .................................. 02 00295

(51) Int. Cl.
*B23P 19/04* (2006.01)

(52) U.S. Cl. ............................ 29/227; 29/222; 29/224; 29/225; 29/229; 29/238; 29/239

(58) Field of Classification Search .................. 29/222, 29/224, 225, 227, 229, 238, 239
See application file for complete search history.

(56) References Cited

U.S. PATENT DOCUMENTS 4,219,918 A * 9/1980 Klann ......................... 29/227
4,809,951 A * 3/1989 Klann ....................... 254/10.5
5,954,315 A 9/1999 Lambert
6,336,625 B1 * 1/2002 Liao ............................ 267/66

FOREIGN PATENT DOCUMENTS

| | | |
|---|---|---|
| DE | 30 21 084 | 12/1981 |
| DE | 92 16 147 | 3/1993 |
| EP | 0 424 247 | 4/1991 |
| EP | 1 046 469 | 10/2000 |
| GB | 2 117 307 | 10/1983 |

* cited by examiner

*Primary Examiner*—Lee D. Wilson
*Assistant Examiner*—Shantese L. McDonald
(74) *Attorney, Agent, or Firm*—Young & Thompson

(57) ABSTRACT

A spring compressor comprising an actuator with a body and a rod that are telescopically movable relative to each other and two jaws each comprising an attachment portion (2) for attachment to the actuator and a working portion (3) for engaging a turn of a helical spring (8, 9), the working portion (3) of each jaw comprising a first part (4) and a second part (12), one of the parts being connected to the attachment portion (2) and defining a track segment (5) for bearing against a portion of a spring turn, and the other part forming an arm (12) hinged to the attachment portion (2) or to the first part (4) in the vicinity of one end (5*c*) of the track segment (5) about an axis (11) that is substantially perpendicular to the surface of the track segment (5), and forming at its free end a zone for taking charge of a turn of the spring.

12 Claims, 3 Drawing Sheets

MOTOR VEHICLE SUSPENSION SPRING COMPRESSOR

BACKGROUND OF THE INVENTION

The present invention relates to the field of tooling useful in assembling and maintaining motor vehicle suspensions.

Motor vehicle shock absorbers include helical springs which need to be compressed in order to separate them from the shock absorber member proper or to extract the suspension unit fitted with the shock absorber from a vehicle.

Numerous types of spring compressor are known for this purpose. All of them comprise an actuator (mechanical, electrical, hydraulic, or pneumatic) comprising at least two elements that are telescopically movable relative to each other, with each element having a grip member associated therewith for co-operating with the spring (a portion of a turn of the spring for each member) in order to compress it. Those various spring compressors differ from one another firstly by the means for attaching the grip members to the actuator elements, and secondly by the shapes of the grip members depending on whether they have continuous tracks for cooperating with the spring (referred to as cups) or whether they comprise two arms fixed and/or hinged to the attachment portion and having some gutter-shaped ends for receiving the turn of the spring that is to be manipulated (referred to as claws as in document EP-A-1 046 469).

With cups, at least the middle zone of the track has on its inside margin a big flap that forms a radial abutment for the turn of the spring. With claws, the portion of the jaw carrying the arm hinges includes a kind of hook (a small cradle) which receives the spring turn and which performs the same function as the above-mentioned flap.

Each of those two types of jaw possesses its own advantages and drawbacks. Cups provide the spring with support over a line of contact along which load is better distributed than with claws, where at best three point zones come into contact with the spring, so that there are high levels of stress concentration at those locations. Cups are of fixed shape which means that it is necessary to have several sets of cups for manipulating the springs of different dimensions that are to be found on the market, whereas, because of the way the arms are hinged, a single set of claws can encompass a much wider variety of spring sizes.

Both cups and claws are often ill-adapted to taking hold of suspension spring turns close to the end bearing plates of the springs. Unfortunately, with certain shock absorbers, it is appropriate to manipulate the springs as close as possible to those plates in order to eliminate the effects of the end turns of the springs relaxing while the central turns are being compressed, where such relaxing opposes the desired shortening of the spring in order to make disassembly possible.

The present invention seeks to ally the advantages of claws and of cups while eliminating most of their drawbacks, and with the additional advantage of requiring only a single set of jaws for taking action on the great majority of suspension springs present on the market.

SUMMARY OF THE INVENTION

To this end, the invention provides a spring compressor comprising an actuator with a body and a rod that are telescopically movable relative to each other and two jaws, each comprising a portion for attachment to the actuator and a working portion for engaging a turn of a helical spring. In the invention, the working portion of each jaw comprises a first part and a second part, the first part being connected to the attachment portion and defining a segment of track for bearing against a portion of a spring turn, being provided along its inside edge with a turn-retaining rim, and the second part being in the form of an arm hinged either to the first part or to the attachment portion in the vicinity of one end of the segment of track about an axis substantially perpendicular to the surface of the track and forming at its free end a zone for taking charge of a spring turn, which zone may be in the form of a cradle or gutter or may include a hook or a rim for radially retaining the spring turn.

The jaw constituted in this way is much more compact than known cups while offering a large contact area with the turn of the spring engaged in the segment of track. In addition, since it has only one: hinge, this jaw is stronger than a claw jaw which has two hinges through which practically all of the compression force passes, which hinges are the locations of a claw jaw that are mechanically the weakest.

The top surface of the track may be in the form of a circular sector of a ring that is substantially plane and inclined relative to the axis of the attachment portion at an angle which corresponds substantially to the helix angle made by each turn of the spring. It may also be helical in shape. It may also be steerable about an axis perpendicular to the axis of the attachment portion in order to accommodate variation in the helical pitch of the spring while it is being compressed or decompressed.

Furthermore, the claw-forming arm is hinged about an axis (substantially perpendicular to the track) whose direction in three dimensions and relative to the surface of the track segments is determined so that the cradle or the gutter at the end of said arm is situated more or less in circular extension to the surface of the track, so that the support points belong substantially to a surface that is congruent with the surface of the spring portion with which they are in contact when the jaw is engaged. The shape of the arm itself is designed so as to make it as maneuverable as possible.

In a preferred embodiment, a plane bisecting the portion of spring turn engaged by the working portion of the jaw is situated on the same side as the arm relative to a plane containing the center or the axis of the spring and the center or the axis of the portion attaching the jaw to the actuator. This particular shape for the jaw of the invention is that which gives the compressor of the invention the greatest adaptability to various springs on the market in terms of compression effectiveness. Because of this circumference offset, by using two identical jaws on an actuator, it is possible to engage the spring by enveloping it, thereby ensuring safety.

Furthermore, it is advantageous to provide a track segment of width that increases from its free end going towards its end close to the arm hinge. This enables the track to accommodate springs of different diameters.

Other characteristics and advantages of the invention appear from the following description of an embodiment together with certain variants of details.

BRIEF DESCRIPTION OF THE DRAWINGS

Reference is made to the accompanying drawings, in which.

DESCRIPTION OF THE PREFERRED EMBODIMENTS

Figure 1:
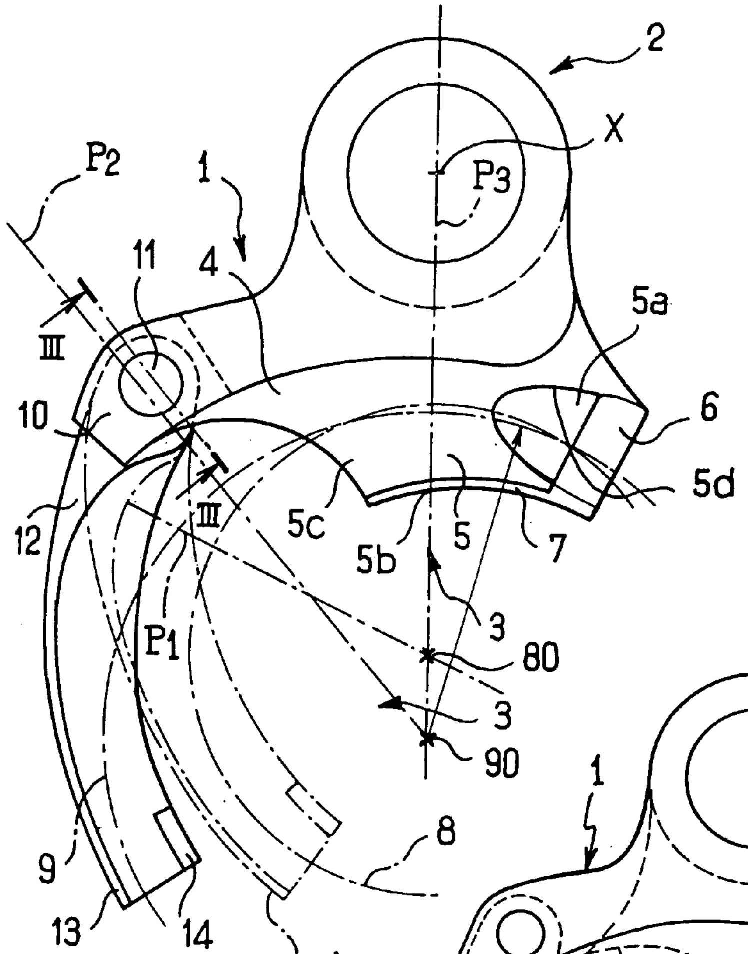
FIG. 1 is a view of the active face of a first embodiment of a jaw of the invention.

The jaw 1 shown in FIG. 1 comprises an attachment portion 2 for attachment to a spring compressor actuator, and a working portion 3 connected to the attachment portion 2 and designed to be engaged with a turn of the spring that is to be compressed. The working portion 3 is made of two parts. A first part 4, in this case integral with the attachment portion 2, defines a segment of track 5 that is circular, plane, or helical. At one of its ends 5*a*, its narrower end, the track 5 has an overlying tab 6 which forms a hook under which it is possible to slide a turn of a spring. This tab 6 extends from the inside edge 5*b* of the track 5 which includes a rim or flap 7 for retaining the turn of the spring. The flap 7 shown in the figure extends along the entire length of the inside edge 5*b* of the track. In a variant that is not shown, the flap could occupy only the central portion of the inside edge. Beneath the tab 6, the end 5*a* of the track segment is hollowed out (reference 5*d*) or chamfered so that the thickness of the wall of the first part 4 forming the track at this location tapers progressively. This chamfer makes it possible to engage the end 5*a* of the track segment as far as possible into the angle formed by the turn of the spring leaving its end plate. The other end 5*c* of the track segment 5 is broader than the end 5*a* (in its radially-measured dimension), thereby enabling it to receive springs such as 8, 9 that are wound to different diameters.

In the vicinity of the end 5*c*, the part 4 carrying the track segment 5 possesses a fork 10 of a hinge with an axis 11 lying outside the track, for engaging an arm 12 which forms the second part of the working portion of the jaw and which has a free end with two rims 13 and 14 that co-operate with the arm to define a cradle or gutter for taking charge of the turn of the spring 8 or 9. The cradle 13, 14 of this arm may be replaced by an end which, like the end 5*a* of the track segment, possesses a tab overlying a surface for engaging a spring turn. Like the track segment, the end of the arm 12 may also be of thickness that tapers progressively. The axis 11 is oriented in such a manner as to be substantially perpendicular to the surface of the track segment 5 so that the cradle at the end of the arm 12 lies substantially in line with the top surface of the track segment 5.

Figure 3:
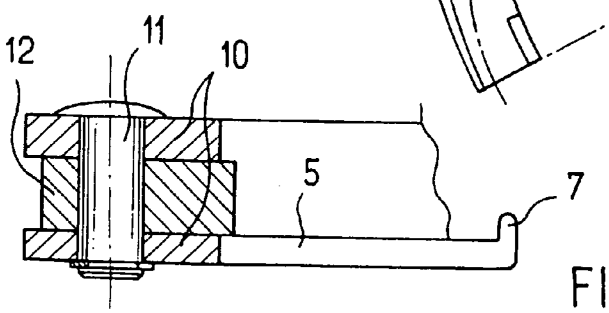
FIG. 3 is a section view on line III—III of FIG. 1.

FIG. 3 is a section view on line III—III of FIG. 1 through the hinge connecting the arm 12 to the part 4. This figure shows the same elements as those described above and they are given the same references.

In FIG. 1, chain-dotted lines show one of the other possible positions 12' for the arm about its hinge axis 11 for the purpose of illustrating the ability of the jaw to support springs 8, 9 having different winding diameters. The center of the spring 8 is referenced 80, while the center of the spring 9 is referenced 90. In this figure, it can be seen that the planes P1, P2 which are respective bisector planes of the turn portions of the springs 8, 9 engaged by the working portion 3 of the jaw are situated on the same side as the arm 12 relative to the plane P3 containing the center or axis X of the attachment portion and the center 80 or 90 of the spring that is engaged.

From FIG. 1, it can be seen that a jaw of the invention engages a spring between the end 5*a* of the track segment and the end of the arm 12 in a manner that is offset circumferentially to a very large extent relative to the plane such as P3 containing the center of the spring and the center of the attachment portion. The jaw of the invention possesses all of the advantages of the offset jaw constituting the subject matter of French patent application FR 2 674 167 in the name of the Applicant.

Figure 2:
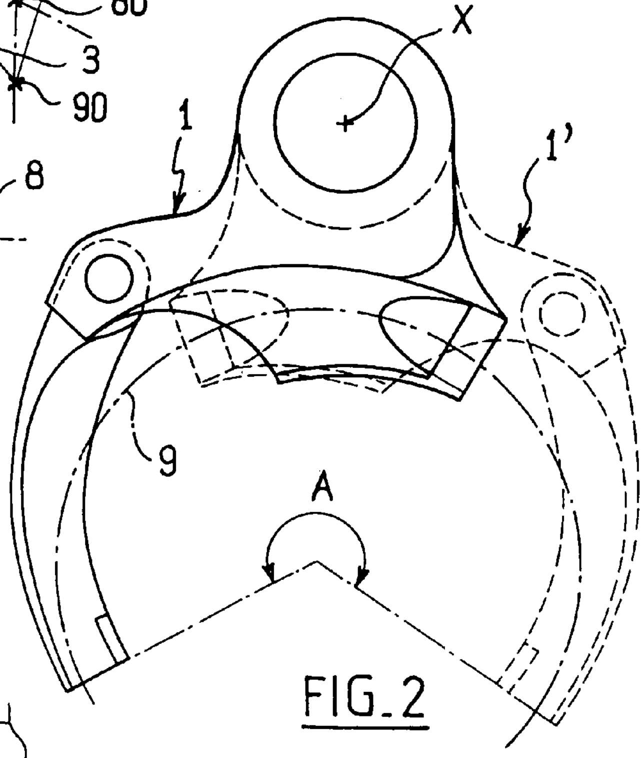
FIG. 2 is a view similar to FIG. 1, in which there is shown in dashed lines a second jaw when such a jaw is attached to the actuator of the spring compressor.

FIG. 2 is a diagram in which dashed lines show a jaw 1' additional to the jaw 1, the additional jaw being in its working position that it occupies when coupled to the spring compressor actuator, e.g. to the rod of the actuator, while the jaw 1 is coupled to the body thereof. In the figure, the jaw 1' is identical to the jaw 1 but turned so that the two active surfaces of the jaws 1 and 1' face each other. From this figure, it can be seen that the spring 9 is engaged between these two jaws in a manner that envelops it to a very large extent, the angle A at the center of the spring 9 corresponding to the extent of the angular arcs of the spring engaged by the jaws being greater than 180°. The spring compressed in this way thus no longer has any tendency to bend while it is being compressed. It should be observed that this angle A increases with decreasing diameter of the spring. It should also be noted that in addition to the qualities due to the jaws being circumferentially offset, the invention provides increased facility in putting the compressor into place on the spring, because, at the time of engagement, the arm can initially be moved away from the spring about its hinge axis and then towards the spring after one of the track segments has been put into place properly, in particular towards the bearing plate.

Figure 4:
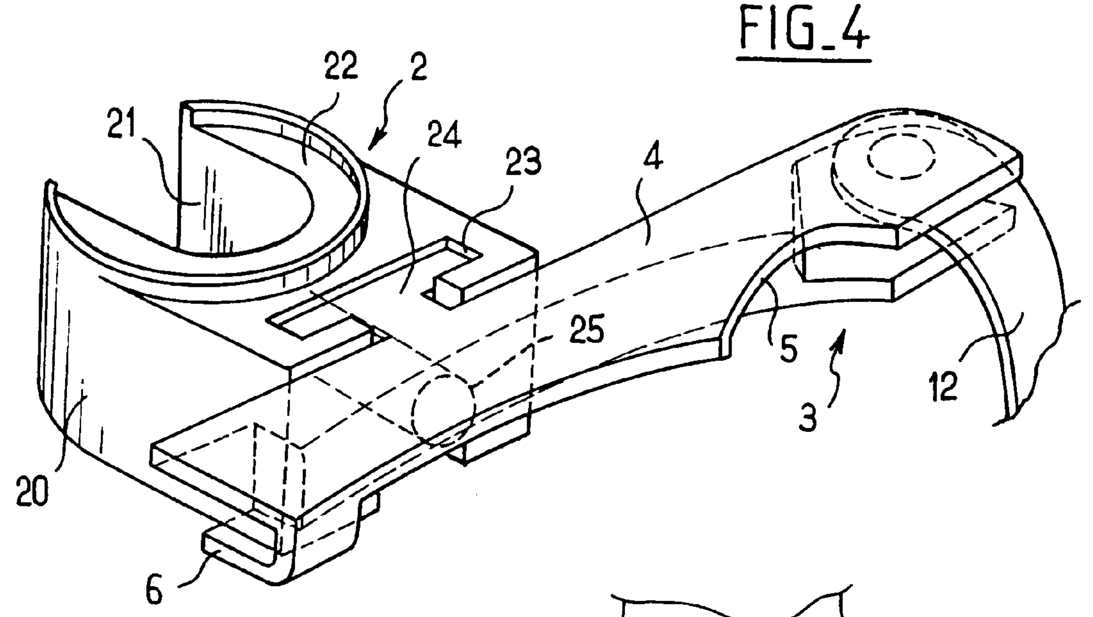
FIG. 4 shows an embodiment of the portion attaching the jaw of the invention to a spring compressor actuator, and a particular embodiment of the connection between the attachment and working portions of the jaw.

FIG. 4 shows an embodiment of an attachment portion 2 of the jaw of the invention which is generally in the form of a sleeve 20 whose central recess 21 is U-shaped, being open in its side facing away from the working portion 3 of the jaw. At its end facing towards the rear face of the working portion, the sleeve 20 includes a countersunk area 22 of inside diameter greater than the width of the central recess 21, centered on the semicylindrical portion of the U-shaped recess 21, and corresponding to the outside diameter of a collar 101 on the body 100 of a compression actuator (see FIG. 8), whereas the width of the opening in the U-shape 21 corresponds to the diameter of the portion 102 of said body 100 that is immediately adjacent to the collar 101. Thus, when the jaw of the invention is put into place on the body 100, it suffices to engage it sideways so that it is astride the portion 102, and then cause it to slide axially so as to cause the collar 101 to penetrate into the countersunk area 22. Portions in relief are provided either on the collar 101 or on the portion 102 of the body 100 so as to co-operate with the flanges of the. U-shape 21 to prevent the jaw from turning relative to the body. In conventional manner, these dispositions for attaching the jaw to the actuator are reproduced identically at the end of the rod 110 of said actuator that is not shown and that includes means exactly the same as those described above.

In FIG. 4, it can be seen that the part 4 of the working portion of the jaw of the invention is not made integrally with the attachment portion 2. The connection between the part 4 and the attachment portion 2 takes place via a T-shaped groove 23 in said attachment portion which receives with clearance a connection head 24 that is of complementary shape and that is secured to the part 4. The attachment portion 2 and the part 4 are also connected to each other by a pin 25 which enables these two elements to be mutually secured while leaving the part 4 free to rock relative to the attachment portion 2 through a distance that is a function of the clearance left between the groove 23 and, the head 24. The working portion 3 is thus mounted to rock relative to the attachment portion 2 of the jaw. This ability of the working portion to pivot or rock enables the jaw to accommodate variations in the helix angle of the spring while it is being compressed.

Figure 5:
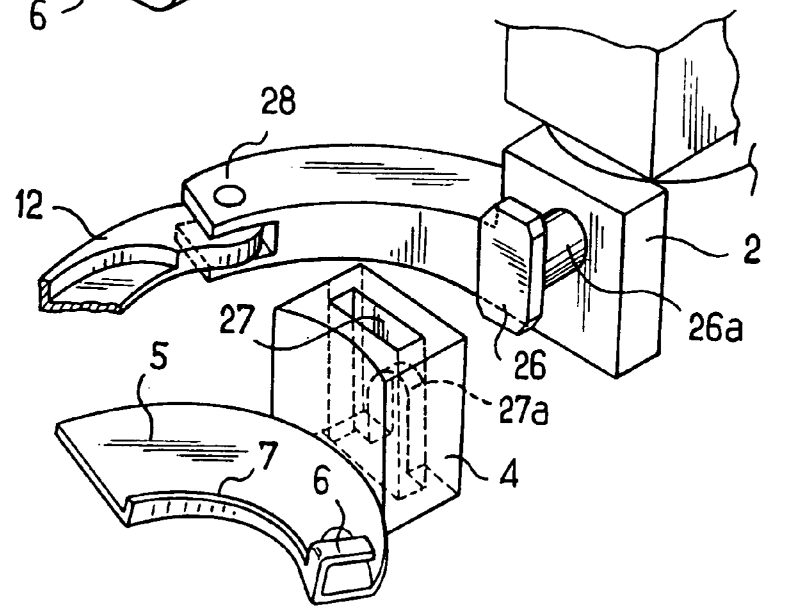
FIG. 5 is a diagram of another embodiment of the jaw of the invention in which the arm is hinged to the attachment jaw instead of being hinged to the part carrying the segment of track.

In the variant embodiment shown in FIG. 5, it is the attachment portion 2 of the jaw which possesses a T-shaped head 26, while it is the part 4 of the working portion of that portion of the jaw that defines the track segment 5 possesses an opening 27 suitable for receiving the head 26 with clearance. Rocking of the part 4 relative to the portion 2 is achieved as described in the Applicants' French patent FR 2 653 051 by the ability of the part to pivot on the foot 26*a* of the head 26 because of the lateral opening 27*a* of U-shape in the opening 27. In this variant embodiment, the arm 12 of the working portion is hinged in a fork 28 which is carried by the attachment portion 2 of the jaw. This variant embodiment makes it possible firstly to install mutually different portions 2 for taking account of special shapes for installing shock absorber springs under a vehicle (by interchanging parts 4 it is possible to adjust the length of the attachment segment 5 and its position relative to the arm 12 and to the axis of the attachment portion 2). In addition, in this variant embodiment, rocking is restricted to the part carrying the track portion, thus making it possible to improve the contact between the track and the turn of the spring.

Figure 6:
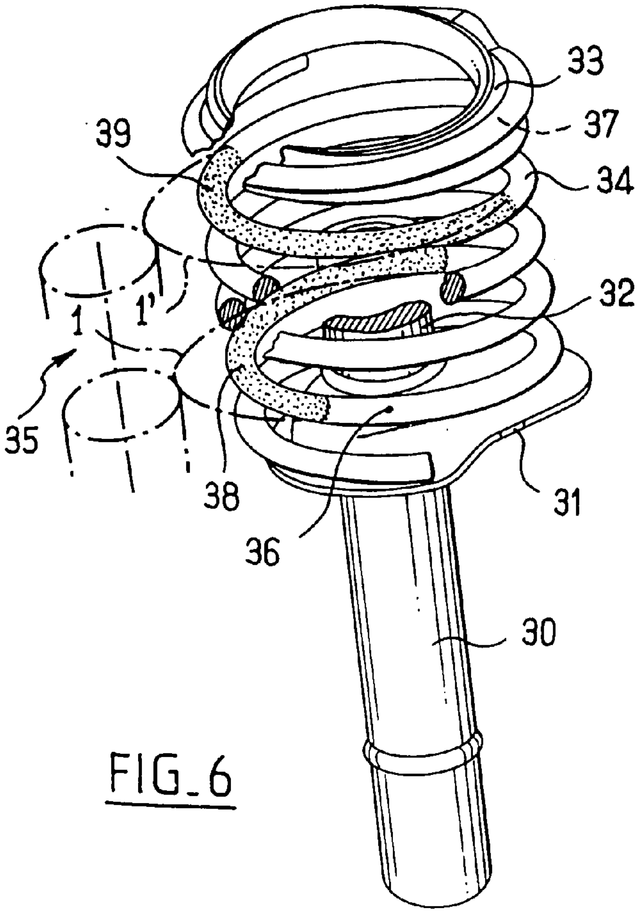

FIG. 6 shows a motor vehicle suspension force leg comprising, in conventional manner, a shock absorber body provided with a plate 31, a shock absorber rod 32, which is shown in part only in order to clarify the drawing and which likewise carries a plate 33, and a spring 34 that is compressed between the two plates 31 and 33. In this figure, chain-dotted lines represent the two jaws 1 and 1' of a spring compressor, which jaws are coupled to an actuator 35. The zone where the spring 34 ceases to bear against the plate 31 is referenced 36. The spring 34 loses contact with the plate 33 in a zone 37. The turn portions of the spring 34 engaged by the jaws 1 and 1' are referenced respectively 38 and 39 and in the drawing these portions are speckled.

The jaw 1 is shown in its position in which the end 5*a* is engaged as close as possible to the zone 36. It can be seen that the same end 5*a* of the jaw 1' is at a distance from the zone 37, which can constitute a small drawback while compressing the spring, but which presents the advantage of leaving the compressor 35 with great angular latitude for being put into place around the spring 34. This advantage is significant when it is necessary to operate underneath the vehicle, i.e. in a space around the plate 33 which is very congested and where often only a small angular window is available for accepting the actuator.

Figure 7:
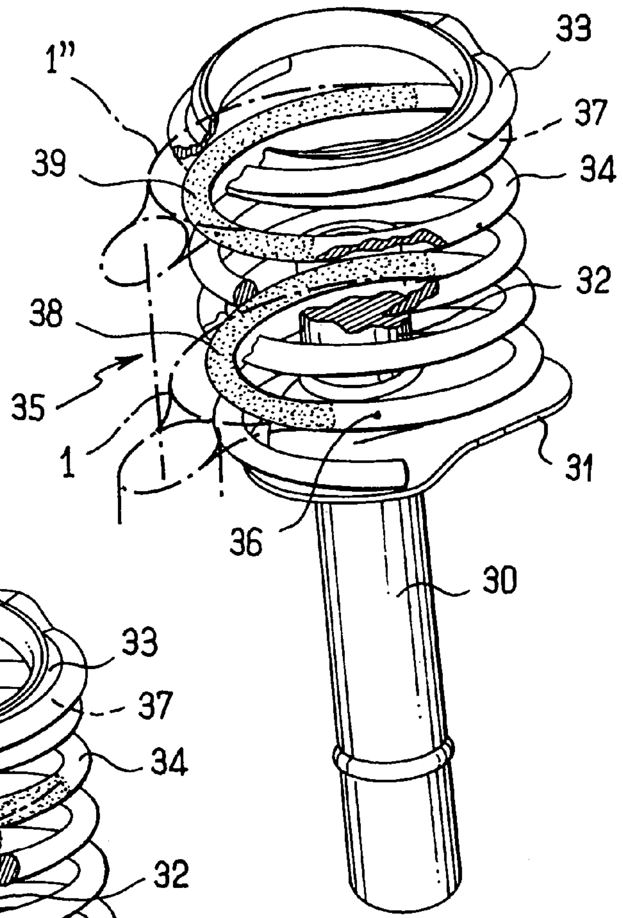
FIGS. 6 and 7 are diagrams showing the spring compressor of the invention engaged with a shock absorber.

FIG. 7 shows the use of a jaw 1" at the plate 33 which is not identical when the jaw 1 but which is symmetrical thereto about a plane containing the axis of its attachment portion and the axis of the springs to be grasped (the plane P3 in FIG. 1). This jaw 1" enables the spring to be grasped closer to the zone 37 than does the jaw 1' (via the free end of its arm 12), but the spring is surrounded or enveloped by the compressor to a smaller extent.

Figure 8:
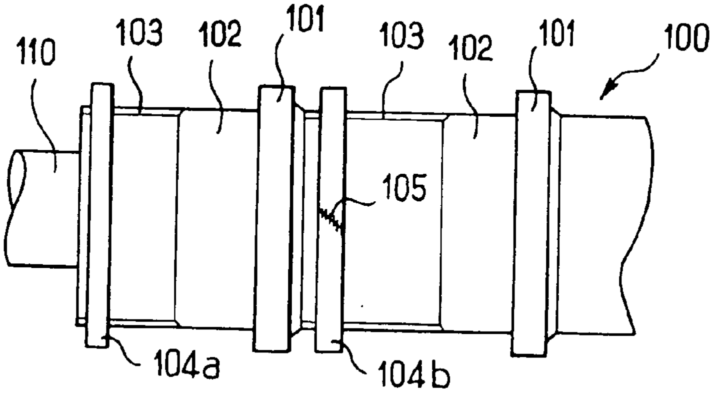
FIG. 8 is a fragmentary outside view of an actuator body enabling a jaw to be attached thereto at two levels.

Finally, FIG. 8 which is described above to some extent, also shows an actuator body 100 possessing two collars 101 defining two possible positions for a jaw of the invention along said body. The portion 102 which surmounts each of the collars 101 possesses a threaded segment 103 which co-operates with a nut 104*a*, 104*b* for clamping the attachment portion of the cup against the corresponding collar 101. This actuator body 100 is made by providing the threaded segments 103 before or after fitting the collar 101 that is furthest from the rod 110 by any appropriate fixing means (welding, brazing, shrink-fitting, . . . ). Thereafter, the nut 104*b* is put into place on the thread 103 closest to said collar, said nut previously being split so as to enable it to pass the non-threaded zone 102 closest to the rod 110. Once this nut has engaged the thread 103, its split is closed by welding 105. Thereafter, the second collar 101 is put into place like the first and the nut 104*a* is then put into place.

It is recalled that other means exist for putting a jaw into place in various positions along the body of a spring compressor actuator, for example the spacer sleeves described in European patent EP 0 398 81.

The invention claimed is:

1. A spring compressor comprising an actuator with a body (100) and a rod (110) that are telescopically movable relative to each other, and two jaws (1, 1') each comprising an attachment portion (2) for attachment to the actuator and a working portion (3) for engaging a turn of a helical spring (8, 9), in which the working portion (3) of each jaw comprises a first part (4) and a second part (12) that are hinged relative to each other, the first part (4) being connected to the attachment portion (2), wherein the first part (4) carries, close to said attachment portion, a circular track segment (5) for bearing against a portion of a spring turn, provided along its inside edge with a rim (7) for retaining the turn, and wherein the second part is in the form of an arm (12) hinged to the attachment portion (2) or to the first part (4) in the vicinity of one end (5*c*) of the track segment (5) about an axis (11) that is substantially perpendicular to the surface of the track segment (5), and whose free end forms a zone for taking charge of a turn of the spring, wherein the track segment (5) has a free end (5*a*) opposed to said one end (5*c*), a width of said free end (5*a*) increasing towards said one end (5*c*).

2. A compressor according to claim 1, wherein the part (4) carrying the track segment (5) includes a tab (6) overlying said free end (5*a*) from an inside edge (5*b*) of said track segment.

3. A compressor according to claim 1, wherein the thickness of the part (4) defining the track segment (5) tapers progressively towards said free end (5*a*).

4. A spring compressor comprising an actuator with a body (100) and a rod (110) that are telescopically movable relative to each other, and two jaws (1, 1') each comprising an attachment portion (2) for attachment to the actuator and a working portion (3) for engaging a turn of a helical spring (8, 9), in which the working portion (3) of each jaw comprises a first part (4) and a second part (12) that are hinged relative to each other, the first part (4) being connected to the attachment portion (2), wherein the first part (4) carries, close to said attachment portion, a circular track segment (5) for bearing against a portion of a spring turn, provided along its inside edge with a rim (7) for retaining the turn, and wherein the second part is in the form of an arm (12) hinged to the attachment portion (2) or to the first part (4) in the vicinity of one end (5*c*) of the track segment (5) about an axis (11) that is substantially perpendicular to the surface of the track segment (5), and whose free end forms a zone for taking charge of a turn of the spring, wherein the connection between the working portion (3) and the attachment portion (2) includes a pivot (25, 26*a*) substantially parallel to the surface of the track (5) and passing substantially through the center of the attachment portion (2).

5. A spring compressor comprising an actuator with a body (100) and a rod (110) that are telescopically movable relative to each other, and two jaws (1, 1') each comprising an attachment portion (2) for attachment to the actuator and a working portion (3) for engaging a turn of a helical spring (8, 9), in which the working portion (3) of each jaw comprises a first part (4) and a second part (12) that are hinged relative to each other, the first part (4) being connected to the attachment portion (2), wherein the first part (4) carries, close to said attachment portion, a circular track segment (5) for bearing against a portion of a spring turn, provided along its inside edge with a rim (7) for retaining the turn, and wherein the second part is in the form of an arm (12) hinged to the attachment portion (2) or to the first part (4) in the vicinity of one end (5*c*) of the track segment (5) about an axis (11) that is substantially perpendicular to the surface of the track segment (5), and whose free end forms a zone for taking charge of a turn of the spring, wherein the attachment portion (2) of each jaw is in the form of a sleeve (20) connected sideways to the working portion (3), the central recess (21) being U-shaped and open sideways away from the working portion (3), and having at least one longitudinal end situated beside the rear face of the jaw that is provided with a countersunk area (22) of diameter greater than the width of the recess (21) in the U-shape.

6. A compressor according to claim 5, wherein the body (100) of the actuator includes two spaced-apart collars (101) for co-operating with the countersunk area (22) of the jaw, and a thread (103) at a distance from each collar (101) for a nut (104*a*, 104*b*) for clamping the jaw against the collar.

7. A spring compressor, comprising:

an actuator with a body and a rod that are telescopically movable relative to each other;

two jaws that each comprises an attachment portion that is attached to said actuator and a working portion that is connected to said attachment portion for engaging a turn of a helical spring;

said working portion comprising a curved track segment for bearing against a portion of a spring turn, said curved track segment crossing a line from a center line of said actuator to a center line of a spring held in the compressor and having distal ends on opposite sides of said line, said curved track segment having a rim on an inside edge for retaining the spring turn; and said working portion further comprising an arm hinged to one of said attachment portion and said curved track segment adjacent to one end of said track segment, said arm being hinged about an axis that is substantially perpendicular to a surface of said track segment and having a free end that engages a turn of the spring.

8. The spring compressor of claim 7, wherein said rim crosses said line.

9. The spring compressor of claim 7, wherein one of said distal ends of said curved track segment comprises a tab overlying a surface of said curved track segment.

10. The spring compressor of claim 9, wherein a thickness of said curved track segment decreases toward said one distal end.

11. The spring compressor of claim 7, wherein said curved track segment comprises a fitting for removably attaching said curved track segment to said attachment portion.

12. A spring compressor comprising an actuator with a body (100) and a rod (110) that are telescopically movable relative to each other, and two jaws (1, 1') each comprising an attachment portion (2) for attachment to the actuator and a working portion (3) for engaging a turn of a helical spring (8, 9), in which the working portion (3) of each jaw comprises a first part (4) and a second part (12) that are hinged relative to each other, the first part (4) being connected to the attachment portion (2), wherein the first part (4) carries, close to said attachment portion, a circular track segment (5) for bearing against a portion of a spring turn, provided along its inside edge with a rim (7) for retaining the turn, and wherein the second part is in the form of an arm (12) hinged to the attachment portion (2) or to the first part (4) in the vicinity of one end (5*c*) of the track segment (5) about an axis (11) that is substantially perpendicular to the surface of the track segment (5), and whose free end forms a zone for taking charge of a turn of the spring, wherein one distal end of said circular track segment comprises a tab overlying a surface of said circular track segment.

* * * * *